US008165987B2

(12) United States Patent
Luk

(10) Patent No.: US 8,165,987 B2
(45) Date of Patent: Apr. 24, 2012

(54) SYSTEM AND METHOD OF MACHINE-AIDED INFORMATION EXTRACTION RULE DEVELOPMENT

(75) Inventor: Alpha Kamchiu Luk, San Jose, CA (US)

(73) Assignee: Business Objects S.A., Levallois-Perret (FR)

( * ) Notice: Subject to any disclaimer, the term of this patent is extended or adjusted under 35 U.S.C. 154(b) by 453 days.

(21) Appl. No.: 12/413,370

(22) Filed: Mar. 27, 2009

(65) Prior Publication Data

US 2010/0250472 A1    Sep. 30, 2010

(51) Int. Cl.
*G06F 7/00* (2006.01)
*G06F 17/00* (2006.01)

(52) U.S. Cl. ...................................................... 707/602

(58) Field of Classification Search .................. None
See application file for complete search history.

(56) References Cited

FOREIGN PATENT DOCUMENTS

EP    1818839 A1 *  8/2007

OTHER PUBLICATIONS

Wong et al., "Adapting Information Extraction Knowledge for Unseen Web Sites", ICDM '02 Proceedings of the 2002 IEEE International Conference on Data Mining, pp. 506-513, 2002, IEEE.*

* cited by examiner

*Primary Examiner* — Michael Hicks
(74) *Attorney, Agent, or Firm* — Fountainhead Law Group PC

(57) ABSTRACT

An automatic rule generation system generates rules for fact extraction. A rule generation module receives a sample and generates a rule from the sample. A rule relaxation module generates a relaxed rule from the rule. A rule testing module generates a reverse index from a corpus, applies the relaxed rule to the reverse index, and generates text segments. An information extraction module generates modified text segments from the relaxed rule and the text segments. A candidate suggestion module performs a candidate generation process: if the candidate generation process generates no candidates, the candidate suggestion module signals the rule relaxation module to generate a further relaxed rule to use as the relaxed rule. A user evaluates a candidate and provides the candidate as an additional sample for the automatic rule generation system to generate another rule to use as the rule. As a result of performing these actions iteratively, the rule is eventually generated and relaxed to result in an appropriate rule to use for fact extraction.

21 Claims, 5 Drawing Sheets

SYSTEM AND METHOD OF MACHINE-AIDED INFORMATION EXTRACTION RULE DEVELOPMENT

CROSS REFERENCE TO RELATED APPLICATIONS

Not applicable.

BACKGROUND

The present invention relates to information extraction rules, and in particular, to systems and methods of generating information extraction rules.

Unless otherwise indicated herein, the approaches described in this section are not prior art to the claims in this application and are not admitted to be prior art by inclusion in this section.

A vast amount of information is accessible on the internet and much more is stored in other repositories. Moreover, a large amount of new information is produced every day. The sheer volume of this information makes human processing of it impossible. In most cases, computer processes such as information extraction provide the only practical way to process a large volume of information in a timely manner. Information extraction is a computer process in which the computer applies certain rules on a piece of text and extracts the bits of information of interest from the text according to the rules. Developing information extraction rules is a rather complicated process that requires special skills as well as time and effort. What makes a particular extraction rule a good rule to use is often subjective and depends upon the needs of the actual application. One criterion of a good rule is accuracy, which may be measured in precision and recall. Another criterion of a good rule is speed, since a rule is not useful if it takes too long to apply to a document. Another criterion of a good rule is complexity; a rule should be simple enough to run on a reasonable machine (e.g., it does not require too many system resources) in a reasonable period of time (e.g., it does not require too much processing time). Even for experienced rule developers, developing good, accurate rules can be difficult and time consuming.

There have been a number of systems that automatically generate extraction rules using Machine Learning techniques. In general, a Machine Learning system automatically produces (induces) models, such as rules and patterns, from data. For example, a Machine Learning system is designed to be configured to do a task based on a set of rules created through user parameterization of heuristic rules via direct parameter input, a training period, or both. As with most Machine Learning-based systems, these systems require large amounts of tagged data to generate each extraction rule. For most applications, finding tagged samples require a significant effort and is a large and difficult task by itself. Therefore, while these systems do not require the specialized skills as required to write extraction rules manually, the amount of effort required is often comparable to or in excess of that of creating them manually.

There have also been a number of systems that can generate extraction rules automatically using untagged data. Virtually all of these systems are bootstrapping-based. Using "seed knowledge" provided by the user, tagged samples are generated from a corpus (collection of documents) by the system automatically. Extraction rules are then derived from the generated samples automatically. For example, the user can provide the system with the person name Mozart and the year of his birth. Then, the system finds all the documents that contain this piece of "target" information on the internet or some other large corpus. From these documents, the system determines all the different ways a person's birth year can be encoded in a piece of text, and from this the system creates the rules for extracting a person's birth year from text.

However, these bootstrapping-based systems are limited in terms of applicability. The systems use methods based on the assumption that the information sought after (such as the named entity, fact or event) have abundant occurrences in the corpus. For example, there would be thousands if not millions of web-pages with the information of some person's birth year, and using a small number of well-known persons as seeds allows the system to collect all the data needed to generate the rules for extracting the birth year of a person. This assumption is only true for the basic or common entities, facts and events. For other entities, facts and events that are less common, the assumption does not hold, and these bootstrapping-based systems do not work.

Thus, there is a need for improved systems and methods of generating extraction rules. The present invention solves these and other problems by providing systems and methods of generating information extraction rules.

SUMMARY

As discussed above, developing CGUL (Custom Grouper User Language) rules for fact extraction is a rather complicated process which requires significant skills as well as time and effort. Even for experienced rule developers, developing good accurate rules can be difficult and time consuming. This is further complicated by the fact that many applications of fact extraction prohibits out-sourcing of the rule-development (e.g. intelligence gathering). This means fact extraction rules are often needed to be developed by domain experts who have little or no expertise in writing CGUL rules. An embodiment of the present invention is directed toward providing help to developers developing CGUL rules for fact extraction.

Embodiments of the present invention improve the generation of extraction rules. In one embodiment the present invention includes a hardware computer that executes a computer program that implements an automatic rule generation system. The computer program includes a rule generation module, a rule relaxation module, a rule testing module, an information extraction module, and a candidate suggestion module. The rule generation module receives a sample and generates a rule from the sample. The rule relaxation module generates a relaxed rule from the rule. The rule testing module generates a reverse index from a corpus, applies the relaxed rule to the reverse index, and generates text segments. The information extraction module generates modified text segments from the relaxed rule and the text segments. The candidate suggestion module performs a candidate generation process: if the candidate generation process generates no candidates, the candidate suggestion module signals the rule relaxation module to generate a further relaxed rule to use as the relaxed rule. A user evaluates a candidate and provides the candidate as an additional sample for the automatic rule generation system to generate another rule to use as the rule. As a result of performing these actions iteratively, the rule is eventually generated and relaxed to result in an appropriate rule to use for fact extraction. A hardware computer may then execute the rule to extract the desired facts from source data.

According to an embodiment of the present invention, a computer-implemented method performs the above actions.

According to an embodiment of the present invention, a computer program product includes a computer readable medium having a computer readable program code embodied therein, that performs the above actions when executed by a data processing apparatus.

The following detailed description and accompanying drawings provide a better understanding of the nature and advantages of the present invention.

DETAILED DESCRIPTION

Described herein are techniques for generating extraction rules. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

An embodiment of the present invention may address one or more of the issues described in the Background. Using an embodiment of the present invention, a user can generate extraction rules for non-common entities, facts and events, using an untagged corpus. According to an embodiment, the system provides one or more of the following features. One feature is that it eliminates the need to write extraction rules manually, thus also eliminating the requirement for specialized skills. Another feature is that it helps the users to gather the sample data needed to generate rules, thus significantly reducing the amount of effort required.

Figure 1:
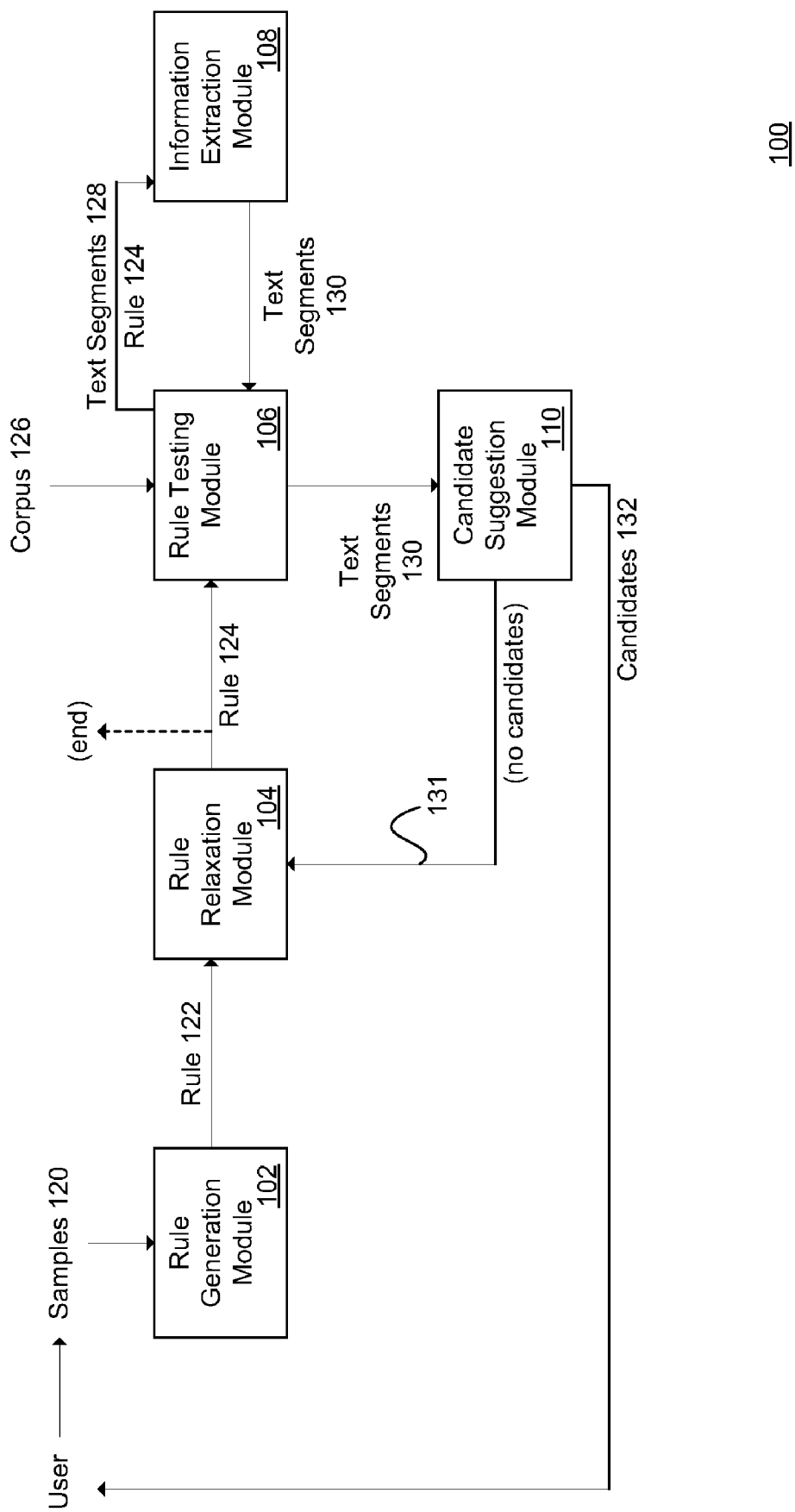
FIG. 1 is a block diagram of a system for rule generation according to an embodiment of the present invention.

FIG. 1 is a block diagram of a system for rule generation 100 according to an embodiment of the present invention. The system 100 is used by a user to take in one or more samples and to generate an initial rule to characterize the samples. The system 100 relaxes the rule and creates a series of candidates for the user to review. Through an iterative process of the user evaluating the samples and the system refining the rule, the operation of the system 100 results in the generation of an appropriate extraction rule. The extraction rule may be encoded in a machine readable format that is suitable for controlling the operation of a hardware computer. Additionally, the rule may be displayed to the user in a human readable format. The system 100 includes a rule generation module 102, a rule relaxation module 104, a rule testing module 106, an information extraction module 108, and a candidate suggestion module 110. The system 100 (or its component modules) may be implemented as one or more computer programs executed by one or more hardware computer systems. The computer programs may be embodied on a tangible computer readable storage medium.

The rule generation module 102 receives samples 120 (from a user) and generates a rule 122 from the samples 120.

The rule relaxation module 104 receives the rule 122 and generates a relaxed rule 124 from the rule 122.

The rule testing module 106 receives the relaxed rule 124 and a corpus 126. The rule testing module 106 processes the corpus 126 and generates a reverse index. The rule testing module 106 applies the relaxed rule 124 to the reverse index and generates text segments 128. The rule testing module 106 provides the relaxed rule 124 and the text segments 128 to the information extraction module 108.

The information extraction module 108 receives the relaxed rule 124 and the text segments 128 and generates modified text segments 130. The rule testing module 106 provides the modified text segments 130 to the candidate suggestion module 110.

The candidate suggestion module 110 receives the modified text segments 130 and performs a candidate generation process. If the candidate generation process generates no candidates (line 131), the candidate suggestion module 110 signals the rule relaxation module 104 to generate a further relaxed rule 124. If the candidate generation process generates candidates 132, the candidate suggestion module 110 provides the candidates 132 to the user for evaluation as additional samples 120.

The interaction of the modules then continues as the user provides additional samples 120 to the rule generation module 102. The interaction stops when the rule relaxation module 104 determines that the relaxed rule 124 is the same as the rule 122, in which case the rule relaxation module 104 informs the user that the relaxed rule 124 (or equivalently, the rule 122) is an appropriate extraction rule. Further details of the operation of the system 100 are provided with reference to FIG. 2.

Figure 2:
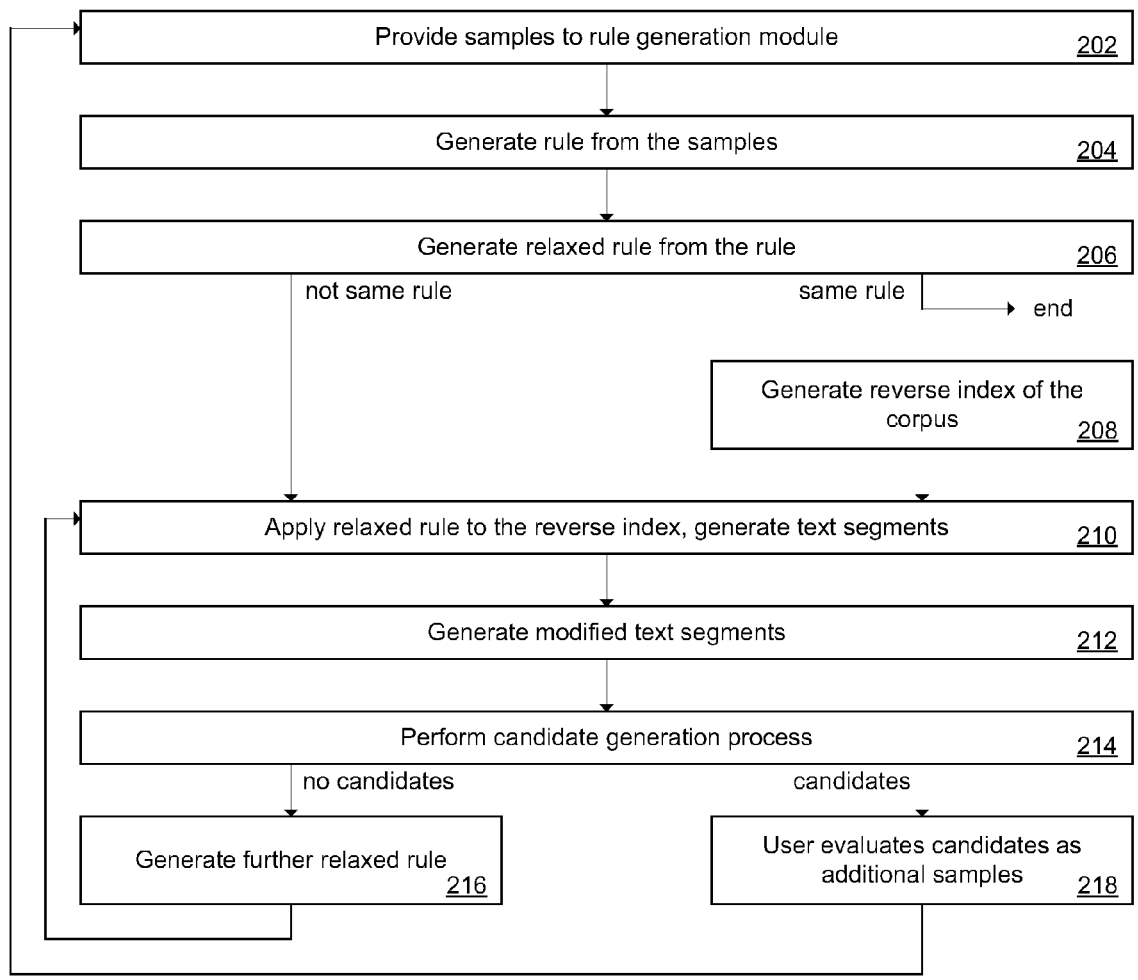
FIG. 2 is a flowchart of a method of rule generation according to an embodiment of the present invention.

FIG. 2 is a flowchart of a method of rule generation 200 according to an embodiment of the present invention. The method 200 may be performed by the system 100. (For ease of explanation, the method 200 will be described below with reference to the system 100.) The method 200 may be implemented as one or more computer programs executed by one or more hardware computer systems. The computer programs may be embodied on a tangible computer readable storage medium.

In box 202, the user provides the samples 120 to the rule generation module 102.

In box 204, the rule generation module 102 generates the rule 122 from the samples 120. The rule generation module 102 provides the rule 122 to the rule relaxation module 104.

In box 206, the rule relaxation module 104 receives the rule 122, generates a relaxed rule 124, and stores a current rule. Initially, the rule relaxation module 104 generates the relaxed rule 124 from the rule 122 and stores the relaxed rule 124 as the current rule. Through an iterative process (see box 216 below), the rule relaxation module 104 further relaxes the current rule as a new relaxed rule 124. If the new relaxed rule 124 is the same as (matches) the stored rule, the rule relaxation module 104 informs the user that the relaxed rule 124 is an appropriate extraction rule, and the process ends. Otherwise, the rule relaxation module 104 provides the relaxed rule 124 to the rule testing module 106.

In box 208, the rule testing module 106 receives the corpus 126 and generates a reverse index of the corpus 126. As further detailed below, the reverse index may be generated as part of a one-time initialization process, which may occur at any time prior to the use of the reverse index in box 210.

In box 210, the rule testing module 106 receives the relaxed rule 124, applies the relaxed rule 124 to the reverse index, and generates the text segments 128. The rule testing module 106 provides the relaxed rule 124 and the text segments 128 to the information extraction module 108.

In box 212, the information extraction module 108 receives the relaxed rule 124 and the text segments 128 and generates the modified text segments 130. The rule testing module 106 provides the modified text segments 130 to the candidate suggestion module 110.

In box 214, the candidate suggestion module 110 receives the modified text segments 130 and performs a candidate generation process. If the candidate generation process generates no candidates, the process proceeds to box 216. If the candidate generation process generates the candidates 132, the process proceeds to box 218.

In box 216, the candidate suggestion module 110 signals the rule relaxation module 104 to generate a further relaxed rule 124. The process then proceeds to box 210.

In box 218, the candidate suggestion module 110 provides the candidates 132 to the user. The user evaluates the candidates 132. The user then provides positive candidates as additional samples 120 to the rule generation module 102. The processing then proceeds to box 204.

Further details of the system 100 and the method 200 are provided below.

1. Information Extraction Module 108

The information extraction module 108 may be implemented by an information extraction system. According to an embodiment, the information extraction module 108 may be implemented by components of the Inxight™ products from SAP® BusinessObjects™, Palo Alto, Calif. According to an embodiment, the information extraction module 108 may be implemented by the SAP® BusinessObjects™ Text Analysis product, the SAP® BusinessObjects™ Text Analysis SDK product, or the SAP® BusinessObjects™ Inxight™ ThingFinder product.

The inputs to the information extraction module 108 are as follows. One input is one or more extraction rules codified in the system-specific format. Another input is one or more text documents. For example, the rule testing module 106 may provide the relaxed rule 124 and the text segments 128 to the information extraction module 108.

The output from the information extraction module 108 is text segments from the input documents that satisfy the input rules. For example, the information extraction module 108 may output the modified text segments 130 based on the text segments 128 that satisfy the relaxed rule 124.

2. Rule Testing Module 106

Figure 3:
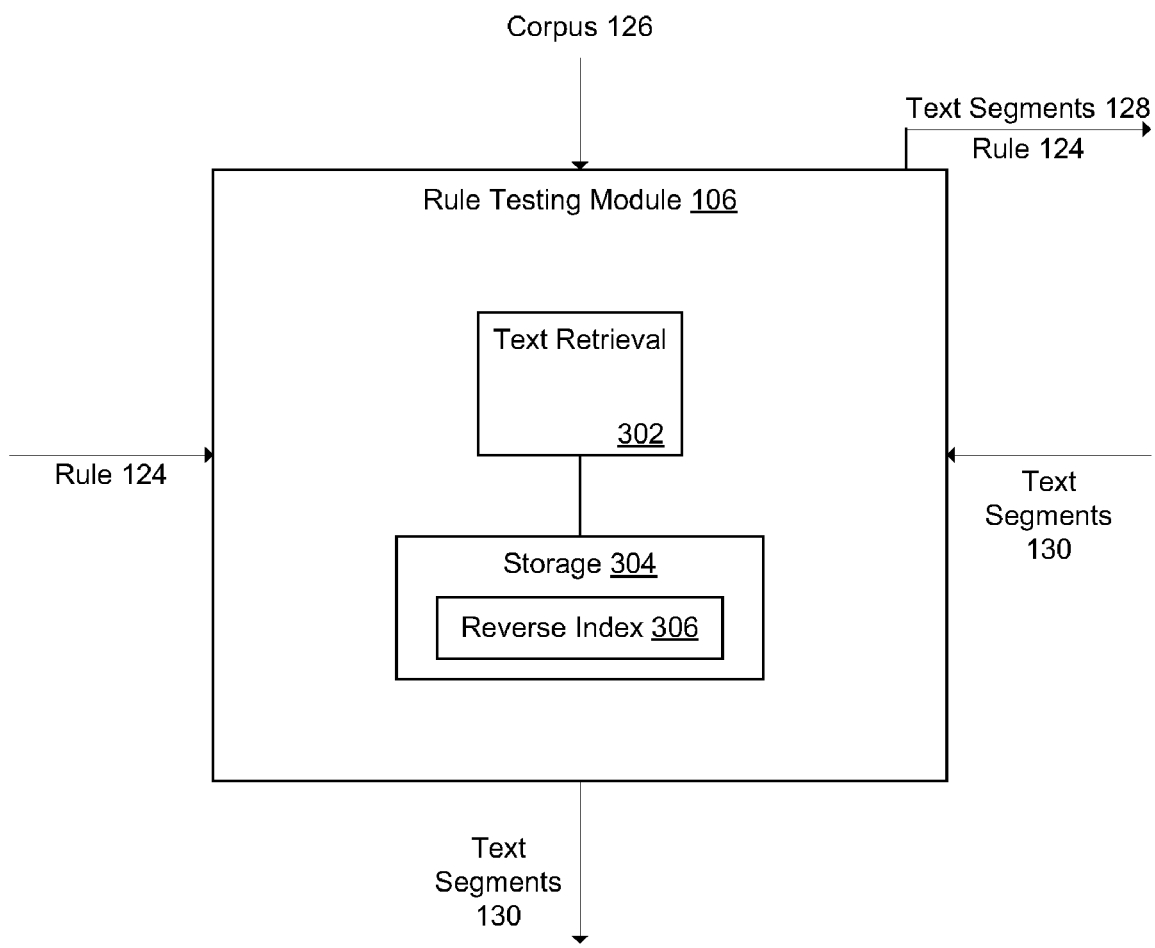
FIG. 3 is a block diagram of the rule testing module 106 according to an embodiment of the present invention.

FIG. 3 is a block diagram of the rule testing module 106 according to an embodiment of the present invention. The rule testing module 106 includes a text retrieval system 302 and a storage system 304. The storage system 304 stores a reverse index 306. (Note that the storage system 304 may be a persistent store such as a disk drive system that is a component of the computer system that implements the rule testing module 106 or the system 100.)

The text retrieval system 302 processes the corpus 126 and generates the reverse index 306. In general, a reverse index tabulates all documents that contain a given word. This may be contrasted with a regular index, which contains the locations of all words within a document.

Generating the reverse index 306 may be done as part of an initialization process for the rule testing module 106. The initialization process may include the following actions. First, if there is currently a reverse index (for example, corresponding to a prior corpus) in the storage system 304, the rule testing module 106 removes that reverse index. Second, the text retrieval system 302 generates the reverse index 306 from the corpus 126 and stores the reverse index 306 in the storage system 304.

The text retrieval system 302 operates as follows. Upon receiving a query, the text retrieval system 302 accesses the reverse index 306 to determine a subset of the documents in the corpus 126 that satisfy the query. The query may correspond to the relaxed rule 124, as more fully described below.

In general, the rule testing module 106 operates as follows. The rule testing module 106 receives as input one or more extraction rules (e.g., the relaxed rule 124) codified in the format specific to the information extraction module 108. The rule testing module 106 generates as output text segments (e.g., the modified text segments 130) from any of the documents in the corpus 126 used in the initialization process which satisfy the input rules (e.g., the relaxed rule 124).

More specifically, the rule testing module 106 and the information extraction module 108 operate together as follows. First, the rule testing module 106 converts the input extraction rule (e.g., the relaxed rule 124) to a text retrieval query in the format specific to the incorporated text retrieval system 302. Second, the text retrieval system 302 retrieves a set of documents that is a superset of the set of documents in the corpus 126 that contains text segments that satisfy the input rules (e.g., the relaxed rule 124). Third, the rule testing module 106 passes the input extraction rule (e.g., the relaxed rule 124) and the text segments returned by the text retrieval system 302 (that is, the text segments 128) to the information extraction module 108 as input. Fourth, the rule testing module 106 returns as output the text segments returned by the information extraction module 108 (that is, the modified text segments 130).

3. Rule Relaxation Module 104

In general, the rule relaxation module 104 maintains a store of an extraction rule (e.g., the rule 122, the relaxed rule 124, etc.). Upon initialization of the rule relaxation module 104, any existing extraction rule is removed from the store. The rule relaxation module 104 performs three functions: rule submission, rule retrieval, and rule relaxation.

The rule submission process is as follows. An extraction rule codified in the format specific to the information extraction module 108 may be submitted to the rule relaxation module 104 (e.g., the rule 122). The rule submitted replaces any existing extraction rule in the store.

The rule retrieval process is as follows. An extraction rule codified in the format specific to the information extraction module 108 may be retrieved from the rule relaxation module 104 using this process. First, the rule relaxation module 104 checks whether there is an extraction rule in the store; if not, the rule relaxation module 104 returns an appropriate message to the caller and exits. Second, the rule relaxation module 104 uses a rule relaxation process to create a new rule from the rule currently in the store. Third, if the newly created rule is different from the rule currently in the store, the new rule replaces the existing rule, and the new rule is returned with the tag "relaxed" (e.g., the relaxed rule 124 is output). Fourth, if the newly created rule is the same as the rule currently in the store, the new rule is returned with the tag "same".

The rule relaxation process takes an extraction rule as input (e.g., the rule 122) and creates a new extraction rule codified in the same format (e.g., the relaxed rule 124). This relaxed rule, when used with any collection of text documents as input to the information extraction module 108 or the rule testing module 106, causes the information extraction module 108 or the rule testing module 106 to return a set of text segments that is a superset of the set of text segments returned when the original extraction rule and the same collection of text documents are given as input. If the rule cannot be further "relaxed", the newly created rule will be the same as the original rule.

The specific operations performed in the rule relaxation process depend upon the implementation of the information extraction module. In general, the rule relaxation process causes the module to return a set of the text segments that is a superset of the set of text segments returned when the original extraction rule and the same collection of text documents are given as input. As an example, the process may relax a rule by removing some of the criteria. More specifically, if the rule says, a date is a month, followed by a day, followed by a year, then the relaxation process may remove the requirement of a year, so that the date rule becomes simply a month followed by a day.

4. Rule Generation Module 102

In general, the rule generation module 102 maintains a store of positive and negative samples of the target text segments. The store may be a persistent store. When the rule generation module 102 is initialized, any existing samples are removed from the store. The rule generation module 102 performs a sample submission process, a rule retrieval process, and a rule generation process.

In the sample submission process, the user submits a positive or negative sample of the target text segments to the rule generation module 104. The rule generation module 102 adds the submitted sample to the store and marks it as positive or negative accordingly.

In the rule retrieval process, an extraction rule can be retrieved. When invoked, the rule generation module 102 checks whether there is one or more positive samples in the store. If not, the rule generation module 102 returns an appropriate error message to its caller. If there are one or more positive samples in the store, the rule generation module 102 invokes the rule generation process and returns the generated rule.

The rule generation process generates an extraction rule which, when used with any collection of text documents that contain the positive and negative samples in the store as input to the information extraction module 108, causes the information extraction module 108 to return a set of text segments containing all or most of the positive samples but none or only a small portion of the negative samples. The rule generation process may involve machine learning techniques. The internal workings of the rule generation process are dependent upon the specific implementation of the rule generation module 102.

5. Candidate Suggestion Module 110

In general, the candidate suggestion module 110 maintains a store of text segments called "candidates". When the candidate suggestion module 110 is initialized, any existing candidates are removed from the store. The candidate suggestion module 110 performs a candidate submission process and a candidate retrieval process.

In the candidate submission process, the rule testing module 106 submits a text segment to the candidate suggestion module 110 for evaluation as a candidate. When a text segment is submitted, first the candidate suggestion module 110 compares it against all the previously submitted candidates in the store. If it matches any of these candidates, the process is completed. If not, the process continues. Second, the candidate suggestion module 110 adds the newly submitted text segment to the module store. Third, the candidate suggestion module 110 scores the newly added candidate and stores the score with the candidate in the store. Fourth, the candidate suggestion module 110 updates the scores of all other candidates in the store.

The candidate retrieval process may be used to retrieve candidates. When invoked, the candidate suggestion module 110 looks for the candidate that has the highest score among the candidates that have not been returned previously and have scores higher than or equal to a pre-determined threshold value. If such a candidate is found, the candidate suggestion module 110 returns it and then marks the returned candidate as "returned". If a candidate is not found, an appropriate message to that effect is returned.

The scoring method implemented may vary depending upon the implementation. In general, the candidate suggestion module 110 scores the candidates according to each candidate's influence as a training sample input (positive or negative) to the rule generation module 102. Without loss of generality, the candidate suggestion module 110 may score a candidate according to how different it is from all the other candidates in the store, in terms of words or entities the candidates contain, or the grammar structures of the candidates, or other measure of similarities.

Figure 4:
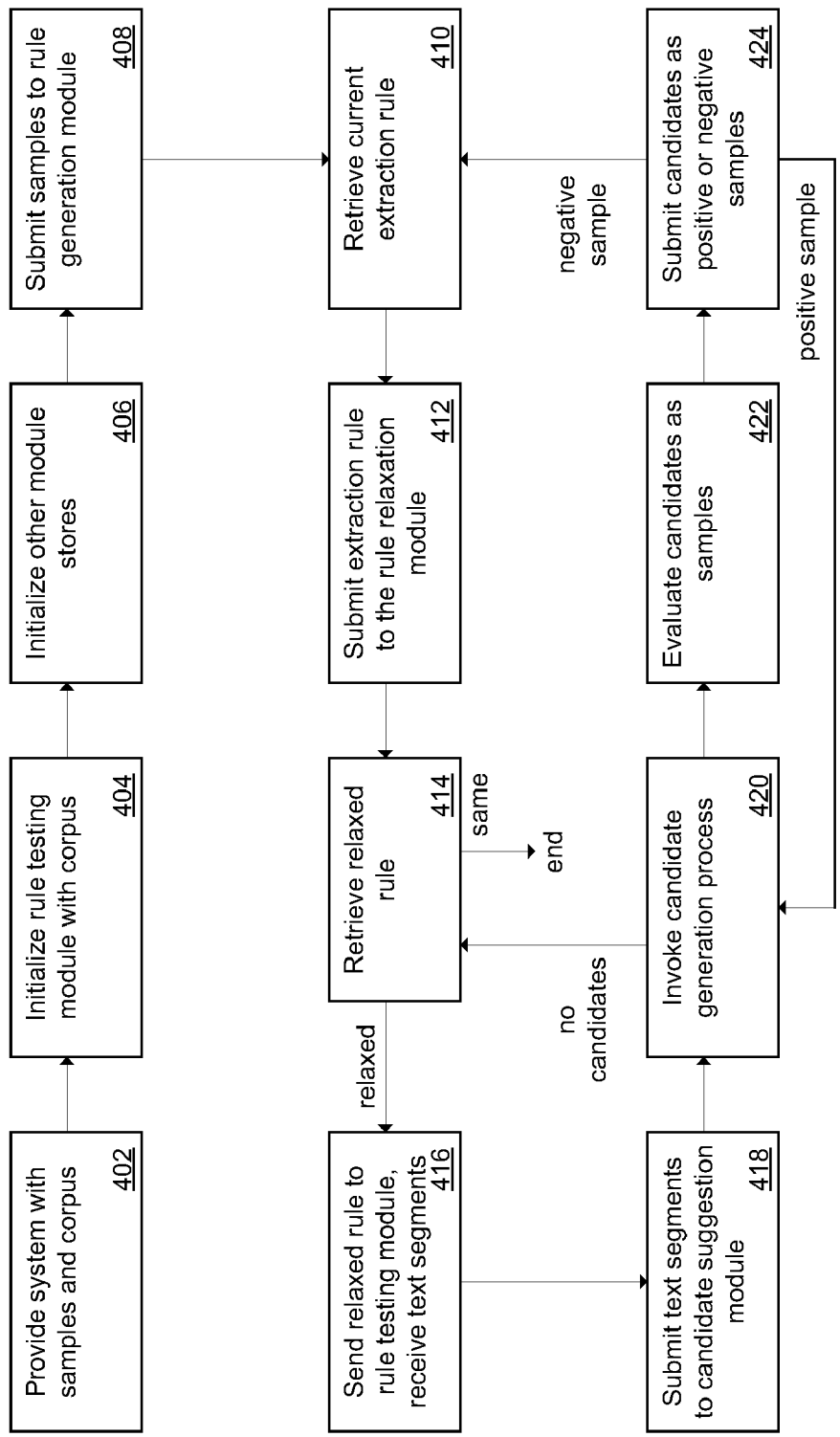
FIG. 4 is a flowchart of a method of rule development according to an embodiment of the present invention.

FIG. 4 is a flowchart of a method 400 of rule development according to an embodiment of the present invention. The method 400 is similar to the method 200, with additional details. The method 400 may be performed by the system 100. (For ease of explanation, the method 400 will be described below with reference to the system 100.) The method 400 may be implemented as one or more computer programs executed by one or more hardware computer systems. The computer programs may be embodied on a tangible computer readable storage medium.

In box 402, the user provides the system 100 with the following items: one or more positive samples of the text segments the target extraction rule should extract; zero or more negative samples; and a corpus (a collection of documents) that contains some documents that contain the target text segments.

In box 404, the system 100 initializes the rule testing module 106 with the corpus 126.

In box 406, all other modules with stores are initialized.

In box 408, the system 100 submits each of the samples provided in box 402 to the rule generation module 102.

In box 410, the system 100 retrieves the current extraction rule from the rule generation module 102.

In box 412, the system 100 submits the extraction rule obtained in box 410 to the rule relaxation module 104.

In box 414, the system 100 retrieves a rule (e.g., the relaxed rule 124) and a tag from the rule relaxation module 104. If the rule relaxation module 104 returns a rule and the tag "relaxed", the system 100 continues with box 416. If the rule relaxation module 104 returns a rule and the tag "same", the system 100 returns the rule 124 to the user and exits the rule development process.

In box 416, the system 100 sends the extraction rule obtained in box 414 as input to the rule testing module 106, and the rule testing module 106 returns a set of text segments 130 which satisfies the rule 124.

In box 418, the system 100 submits each of the text segments 130 obtained in the box 416 to the candidate suggestion module 110.

In box 420, the system 100 tries to retrieve a candidate from the candidate suggestion module 110 by invoking the candidate retrieval process. If the candidate suggestion module 110 returns a candidate 132, the system 100 continues with box 422. If the candidate suggestion module 110 does not return a candidate, the system 100 returns to box 414.

In box 422, the system 100 presents the candidate 132 obtained in box 420 to the user and instructs the user to determine whether the candidate 132 is a positive or negative sample of the target text segments and to provide the system 100 with the result.

In box 424, the system receives the input from the user. If the user determines that the candidate 132 is a positive sample, the system 100 submits the candidate 132 obtained in box 420 to the rule generation module 102 as a positive sample, and the system 100 returns to box 420. If the user determines that the candidate 132 is a negative sample, the system 100 submits the candidate 132 obtained in box 420 to the rule generation module as a negative sample, and the system 100 returns to box 410.

IMPLEMENTATION EXAMPLE

Described below is a specific example implementation of the system 100. The implementation example may perform the method 200 or the method 400. (In the interest of removing redundancy, references to components of the system 100 or actions of the method 200 or the method 400 are not provided unless the reference is undeterminable from the context.) The implementation example may be implemented as one or more computer programs executed by one or more hardware computer systems. The computer programs may be embodied on a tangible computer readable storage medium.

As discussed above, an embodiment of the present invention may have one or more of the following aims. Firstly, it aims to speed up the development process so that rules development can be less expensive and time consuming, and more accurate rules can be developed in the same time frame (given the same resources). Secondly, it aims to aid the developer in collecting test samples so that better recall can be achieved. Finally, it aims to allow non-technical users who have little or no knowledge of CGUL to develop CGUL rules that have decent accuracy.

An embodiment of the present invention may include one or more of the following features. The first feature is real-time CGUL-rule batch testing/real-time extraction/search in CGUL. The second feature is machine-aided sample collection. The third feature is automatic rule induction (ARI). Feature #1 may be independent of Feature #2 and Feature #3. Feature #2 may depend on (may require) Feature #1, but not Feature #3. Feature #3 may depend on (may require) both Feature #1 and Feature #2. The three features may be implemented in separate stages accordingly.

1. Real-Time CGUL-Rule Batch Testing/Real-Time Extraction/Search in CGUL

In order to develop good accurate fact extraction rules, it helps the developer to know how changes made to the rules affect the extraction results. One way to do it is to run a batch test using the TF (ThingFinder) engine. (The TF engine may be a component of the SAP® BusinessObjects™ Text Analysis product or the SAP® BusinessObjects™ Text Analysis SDK product.) In order to determine the behavior of an extraction rule when applied to real data, the test set has to be reasonably large. Running a batch test over a large test set can be quite time consuming. This seriously limits the number of incremental improvements a developer can make in developing a rule. Real-time (or near real-time) batch testing of CGUL rules, according to an embodiment of the present invention, allows development of good accurate rules in a reasonably timeframe. The engine which supports real-time (or near real-time) batch testing of CGUL rules can also be used to support real-time extraction or search in CGUL.

To achieve real-time (or near real-time) performance, extraction uses cached data in the same way as in document retrieval (search). While supporting search for full CGUL directly can be difficult, partial support may be provided by the TextAnalyst™ product according to an embodiment. (The TextAnalyst™ product may be a component of the SAP® BusinessObjects™ Text Analysis product or the SAP® BusinessObjects™ Text Analysis SDK product.) Full support of CGUL may be achieved in a two-step approach: Given any CGUL pattern P to be searched/tested over a pre-processed (indexed) corpus, P is first simplified to a more relaxed form P' (one that will return a superset of the results returned by P). P' is then used as the query to the partial CGUL search engine (e.g., TextAnalyst™ engine that may be implemented by the text retrieval system 302 in the rule testing module 106). The returned results are then fed to the TF engine (e.g., implemented by the rule testing module 106) and ran against the original pattern P to produce the final results.

2. Machine-Aided Sample Collection

Running a batch test on a rule allows the rule developer to see what the rule can extract. By examining the test results, the developer can determine whether the rule is over-extracting (extracting some non-facts). However, running a batch test does not allow the developer to see whether a rule is under-extracting (not extract some target facts present in the text), unless the fact has already been identified by an earlier version of the rule and tagged as positive. Rules developed in the absence of a significantly large set of positive samples may be accurate in terms of precision but often short in recall. An embodiment of the present invention serves to rectify this problem by supporting machine-aided sample collection.

2.1 The "Suggest Candidate Samples" Function

The function "Suggest Candidate Samples" may be implemented as part of the TFWB (ThingFinder Workbench) (e.g., implemented by the candidate suggestion module 110). (The TFWB product may be a component of the SAP® Business Objects™ Text Analysis product or the SAP® BusinessObjects™ Text Analysis SDK product.) In the workbench, the developer can construct a rule and then run the batch test over a test set, examine the test result, adjust the rule accordingly, and re-run the test. This process can be repeated until a desired level of precision and (estimated) recall has been achieved.

As this point, the developer can run the "Suggest Candidate Samples" function on the rule. TFWB then (after some processing time) presents a highlighted candidate sample in its context in a new window, with two buttons: 'ACCEPT' and 'REJECT'. The 'REJECT' button will be enabled but the 'ACCEPT' button will be initially disabled. If the mouse pointer is placed over the disabled ACCEPT button, the message "please tag all relevant and output parts in the sample before clicking ACCEPT" will be displayed. If the candidate does not contain an instance of the target fact, the developer will click the 'REJECT' button. Otherwise, the developer will tag one or more desired output parts and zero or more relevant parts. A "relevant part" is a part useful for identifying the fact but not required to be output. For example, words like "acquire" is relevant in extracting acquisitions and mergers but may not be required to be output. Relevant parts do not have output labels.

The process of tagging output or relevant parts is as follows. First, select some part of the candidate. Second, right click on it. Third, select from the displayed drop down "none", "new label" or one of the displayed output labels (all labels used in the rule or in any of the samples may be listed). Fourth, if "new label" is selected, type the new label name into the pop-up text box.

After the developer has tagged one or more output part(s), the 'ACCEPT' button will be enabled. When the developer has finished tagging the relevant parts of the candidate, he/she can click the 'ACCEPT' button.

After the developer clicks either 'ACCEPT' or 'REJECT', one of two things will happen: if there are more candidates to be shown, the next candidate will be presented; if not, a message to that effect will be shown. The developer can judge all the candidates returned (until the system display the "no more candidate" message), or he/she can stop or pause the process any time by closing the window or switching the focus to any other window. If the developer switches to another window, he/she can choose to switch back to this window anytime in the future as long as the window remains open.

The candidate samples suggested are text which would not be extracted using the current version of the rule, but are similar to those which would be extracted. Also, the system would not suggest text which has previously been tagged, either through the batch test or through previous runs of the "Suggest Candidate Samples" function.

After judging the candidate samples, a function called "Update" will be enabled for batch tests which tested the rule used to find candidate samples. Running the "Update" function will add the judged candidates to the test results, and the recall of the rule will be adjusted (lowered) accordingly. (Similarly, subsequent batch test results will also include the judged candidates.) The developer can now adjust/improve the rule and re-run the batch test, until a desired level of precision and recall has been achieved again. At this point, the developer can re-run the "Suggest Candidate Samples" function.

This process can be repeated until the "Suggest Candidate Samples" function can no longer find candidate samples which are positive or until any developer-specified criterion is satisfied (e.g., 50 positive samples have been found, or 8 hours of development time has been used up).

2.2 Maintaining the Sample Set

TFWB (e.g., implemented by the rule generation module 102) may maintain a persistent store of a sample set for each rule. This sample set may contain the judged candidate samples collected in the process described in the previous section. The sample set may also contain batch test results which have been judged.

This sample set can be accessed through the "Open Sample Set" function. To access this function, select a rule, right click and then select "Open Sample Set". The sample set will be displayed in a table similar to that used to display the batch test results. In addition to sorting and opening individual sample, as in the batch rest result table, the sample set table will also support editing. The developer can delete any sample from the set. To delete a sample, right click on the sample and select "remove sample" from the dropdown. The developer can also open individual sample and change its tagging and label. To edit the tagging or labels, open the individual sample by double clicking it (or right click on a sample and select "edit sample" from drop down). To remove a tagging, right click on a highlighted part of the text, select "remove tagging" from the dropdown. To change the label, right click on a highlighted part of the text, select "change label" from the dropdown, and then select a label or "none" from the next drop down. To change the label to a new (non-existing) label, select "new label" from the dropdown and type the new label name in the pop-up text box. To tag a currently untagged part of the text, select the text, right click on it, then select "none", "new label" or one of the output labels in the dropdown. Close the window after editing is finished. A pop-up will be displayed with the choices of "Save Changes and Close" and "Close without Saving". A new sample can also be added. To add a new sample, right click in the empty space of the sample set window, select "Add Sample", and select a document from the test documents displayed; a new sample with the selected document will appear in the sample set table and a new window will open displaying the document. Tag the relevant parts and the desired output of the sample as before and close the window when finished.

3. Automatic Rule Induction

An embodiment of the present invention supports Automatic Rule Induction (ARI). ARI allows a developer to develop extraction rules through tagging samples only. ARI may be implemented by the rule generation module 102.

Before Automatic Rule Induction can be performed, the sample set associated with the rule may contain one or more positive samples. Collection of positive samples can be conducted in one or more of the ways described in the previous section.

To perform Automatic Rule Induction, right click on a rule and select "Induce Rule from Samples". (For rules that have an empty sample set, the "Induce Rule" function will be disabled.) A new rule will be induced from the samples and displayed in the rule pane (after some processing time).

3.1 Workflow

Rule development using Automatic Rule Induction can be conducted in an iterative manner similar to the process described in the previous section, with the manual rule adjustment/improvement step replaced with Automatic Rule Induction. To start the process, the developer can either construct a simple extraction rule as in the process described in the previous section, and then use this simple rule to collect samples through batch testing and/or using the "suggest candidate samples" function. The simple extraction rule can be very simple. For example, a starting rule for the "acquisition and merger" event can simply be "a sentence containing two company entities", or even just "the token 'acquire'". Alternatively, the developer can find positive samples in the test documents using his/her own methods and add these samples to the sample set using the sample set maintenance tool.

An example use case is as follows. The situation is that the user wants to create an extraction rule for extracting dates from text. The user collects a collection of text and provides it as the corpus for the system. The system indexes the corpus and makes it accessible through the rule testing module. The user then locates 2 or 3 sentences containing a date in the text collection, and provides them as training samples to the system. The rule generation module uses these samples to generate a rule. The rule relaxation module then produces a relaxed version of the previously generated rule. The new (relaxed) rule is then passed to the rule testing module. The rule testing module retrieves text segments that satisfy this rule. These text segments are passed to the candidate suggestion module. The candidate suggestion module selects a portion of these text segments and made them available as candidates. These selected segments are presented to the user to verify. The user determines that some of these segments contain dates whereas some do not, and indicates this judgment to the system. The system uses the user's judgment and the presented text segments to create new training samples. The new training samples are fed to the rule generation module and a new rule is generated. This process iterates a few times until no more candidate samples can be found. As a result, a final date extraction rule is returned by the system.

Figure 5:
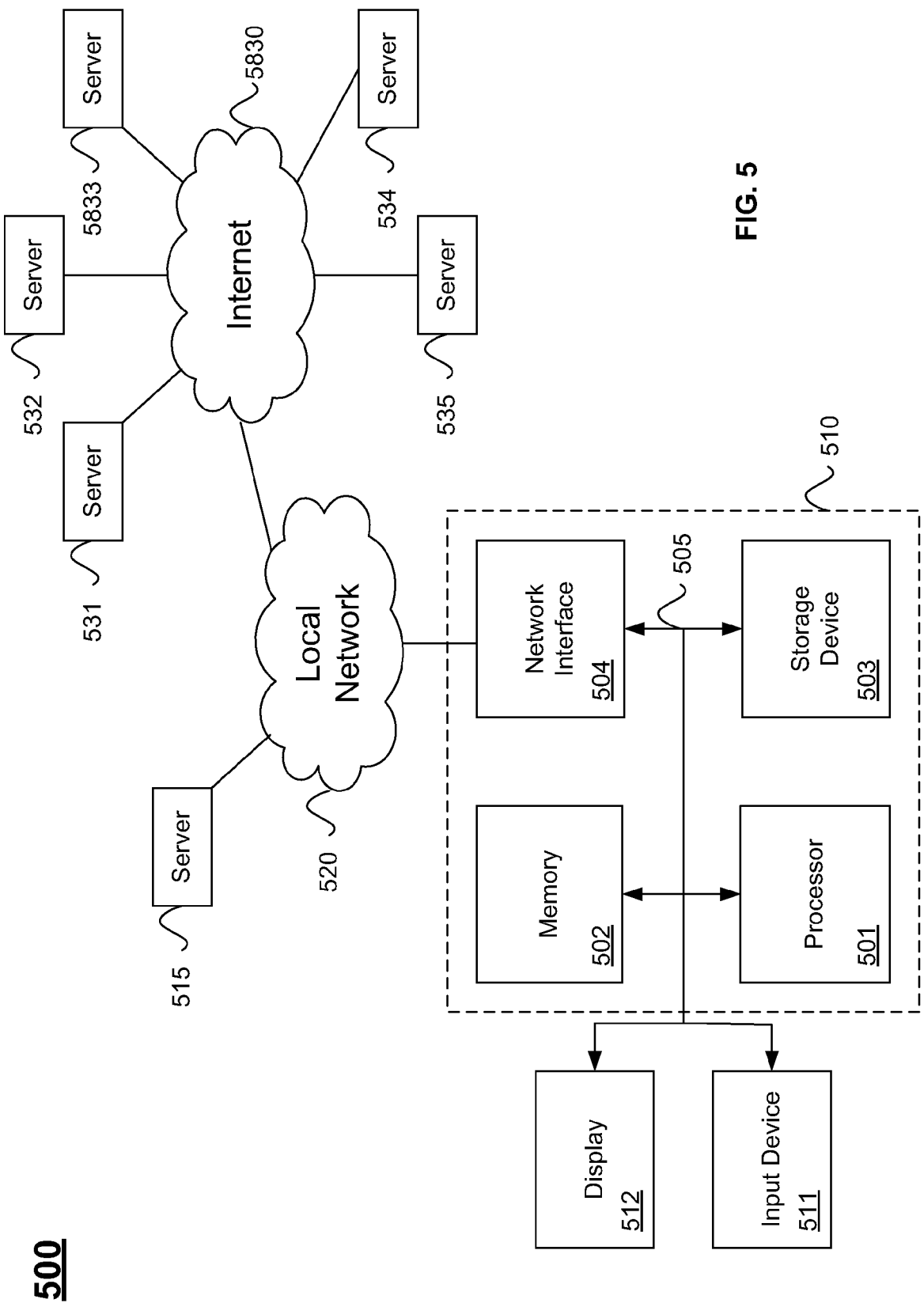
FIG. 5 is a block diagram of an example computer system and network for implementing embodiments of the present invention.

FIG. 5 is a block diagram of an example computer system and network 500 for implementing embodiments of the present invention. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above. This memory may also be used for storing temporary variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques or embodying the constructs above, for example.

Computer system 510 may be coupled via bus 505 to an output device 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 504 sends and receives electrical, electromagnetic, or optical signals that carry digital data streams representing various types of information.

Computer system 510 can send and receive information, including messages or other interface actions, through the network interface 504 to an Intranet or the Internet 530. In the Internet example, software components or services may reside on multiple different computer systems 510 or servers 531, 532, 533, 534 and 535 across the network. A server 531 may transmit actions or messages from one component, through Internet 530, local network 520, and network interface 504 to a component on computer system 510.

According to an embodiment, the system 100 (see FIG. 1) may be implemented by the computer system 510. According to an embodiment, one or more modules of the system 100 may be implemented by the computer system 510, and one or more modules may be implemented by one or more of the servers 531, 532, 533, 534 and 535.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. An automatic rule generation system, comprising:
   a hardware computer that executes a computer program that implements the automatic rule generation system, the computer program including a rule generation module, a rule relaxation module, a rule testing module, an information extraction module, and a candidate suggestion module, wherein:
   the rule generation module receives a sample and generates a rule from the sample;
   the rule relaxation module generates a relaxed rule from the rule;
   the rule testing module generates a reverse index from a corpus, applies the relaxed rule to the reverse index to determine a superset of documents from the corpus that satisfy the relaxed rule as compared to a set of documents that satisfy the rules, and generates text segments from the superset of documents;
   the information extraction module generates modified text segments from the relaxed rule and the text segments; and
   the candidate suggestion module performs a candidate generation process using the modified text segments, wherein:
      if the candidate generation process generates no candidates from the modified text segments, the candidate suggestion module signals the rule relaxation module to generate a further relaxed rule to use as the relaxed rule, and
      if the candidate generation process generates a candidate from the modified text segments, the candidate suggestion module provides the candidate as an additional sample for the automatic rule generation system to generate another rule to use as the rule.

2. The automatic rule generation system of claim 1, wherein a user evaluates a candidate and provides the candidate as the additional sample for the automatic rule generation system to generate another rule to use as the rule.

3. The automatic rule generation system of claim 1, wherein the rule generation module stores a plurality of samples including the sample, and wherein the rule generation module generates the rule from the plurality of samples.

4. The automatic rule generation system of claim 1, wherein the rule generation module stores a plurality of samples including the sample, wherein the plurality of samples includes at least one positive samples, and wherein the rule generation module generates the rule from the plurality of samples.

5. The automatic rule generation system of claim 1, wherein the rule generation module stores a plurality of samples including the sample, wherein the plurality of samples includes at least one positive sample and a plurality of negative samples, and wherein the rule generation module generates the rule from the plurality of samples.

6. The automatic rule generation system of claim 1, wherein the rule relaxation module stores a current rule.

7. The automatic rule generation system of claim 1, wherein the rule relaxation module outputs the relaxed rule as an appropriate extraction rule when the relaxed rule matches a stored rule.

8. The automatic rule generation system of claim 1, wherein the rule testing module comprises:
   a text retrieval system that generates the reverse index; and
   a storage system that stores the reverse index.

9. The automatic rule generation system of claim 1, wherein the rule testing module includes a text retrieval system that retrieves the superset of documents that satisfy the relaxed rule, wherein the text segments correspond to the superset.

10. The automatic rule generation system of claim 1, wherein the candidate suggestion module stores a plurality of candidates that includes the candidate.

11. The automatic rule generation system of claim 1, wherein the candidate suggestion module stores a plurality of candidates and a plurality of scores, wherein the plurality of candidates includes the candidate.

12. The automatic rule generation system of claim 1, wherein the candidate suggestion module stores a plurality of candidates and a plurality of scores, wherein the plurality of candidates includes the candidate, and wherein the candidate generation process generates the plurality of scores.

13. The automatic rule generation system of claim 1, wherein the candidate suggestion module stores a plurality of candidates and a plurality of scores, wherein the plurality of candidates includes the candidate, and wherein the candidate suggestion module provides the candidate to the user according to a corresponding score of the candidate.

14. The automatic rule generation system of claim 1, wherein the rule relaxation module operates iteratively with the rule testing module and the candidate suggestion module until the relaxed rule matches a stored rule.

15. The automatic rule generation system of claim 1, wherein the rule relaxation module operates iteratively with the rule testing module, the candidate suggestion module and the rule generation module until the relaxed rule matches a stored rule.

16. The automatic rule generation system of claim 1, wherein the rule generation module receives the additional sample and generates a rule from the sample and the additional sample, the additional sample generated from the candidate generation process.

17. A computer-implemented method of automatic rule generation, comprising:
   (a) generating a rule from a sample;
   (b) generating, by a computing device, a relaxed rule from the rule and, if the relaxed rule matches a stored rule, returning the relaxed rule as an appropriate extraction rule;
   (c) generating a reverse index of a corpus to determine a superset of documents from the corpus that satisfy the relaxed rule as compared to a set of documents that satisfy the rule;
   (d) generating text segments by applying the relaxed rule from the superset of documents;
   (e) generating modified text segments from the text segments and the relaxed rule;
   (f) performing a candidate generation process on the modified text segments;
   (g) if the candidate generation process generates no candidates, performing again (b) using a further relaxed rule as the relaxed rule;
   (h) if the candidate generation process generates a candidate from the modified text segments, performing:
   (i) receiving an evaluation from a user for the candidate;
   (j) providing the candidate as an additional sample; and
   (k) performing again (a) using the sample and the additional sample to generate another rule to use as the rule, wherein the evaluation from the user is used in generating the rule.

18. The computer-implemented method of claim 17, wherein the sample is one of a plurality of samples, wherein the plurality of samples includes at least one positive sample, and wherein the rule is generated from the plurality of samples.

19. The computer-implemented method of claim 17, wherein the sample is one of a plurality of samples, wherein the plurality of samples includes at least one positive sample and a plurality of negative samples, and wherein the rule is generated from the plurality of samples.

20. The computer-implemented method of claim 17, wherein the candidate generation process comprises:
   generating a plurality of candidates; and
   generating a plurality of scores, wherein the plurality of scores corresponds, respectively, to the plurality of candidates.

21. A non-transitory computer program product, comprising a computer readable medium having a computer readable program code embodied therein, that when executed by a data processing apparatus, implements an automatic rule generation system, comprising:
   a rule generation module that receives a sample and generates a rule from the sample;
   a rule relaxation module that generates a relaxed rule from the rule;
   a rule testing module that generates a reverse index from a corpus, applies the relaxed rule to the reverse index, to determine a superset of documents from the corpus that satisfy the relaxed rule as compared to a set of documents that satisfy the rules, and generates text segments from the superset of documents;
   an information extraction module that generates modified text segments from the relaxed rule and the text segments; and
   a candidate suggestion module that performs a candidate generation process using the modified text segments, wherein:
      if the candidate generation process generates no candidates from the modified text segments, the candidate suggestion module signals the rule relaxation module to generate a further relaxed rule to use as the relaxed rule, and
      if the candidate generation process generates a candidate from the modified text segments, the candidate suggestion module provides the candidate as an additional sample for the automatic rule generation system to generate another rule to use as the rule.

* * * * *